3,655,601
PROCESS FOR THE MANUFACTURE OF BASIC OXAZINE DYESTUFFS
Norbert Ottawa and Gustav Schafer, Frankfurt am Main, Germany, assignors to Farbwerke Hoechst Aktiengesellschaft vormals Meister Lucius & Bruning, Frankfurt am Main, Germany
No Drawing. Filed Feb. 13, 1969, Ser. No. 799,085
Int. Cl. C07d 87/50
U.S. Cl. 260—242                         10 Claims

ABSTRACT OF THE DISCLOSURE

In the process for the manufacture of basic oxazine dyestuffs of the formula

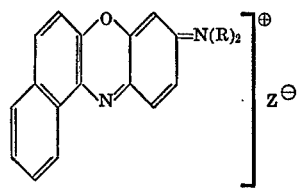

in which R represents an alkyl group of from 1 to 4 carbon atoms and $Z^\ominus$ repersents $Cl^-$ or $ZnCl_3^-$ by heating an amine of the formula

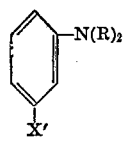

in which R is defined as above and X' represents a hydrogen atom or an alkoxy group of from 1 to 4 carbon atoms, with nitrous acid in an aqueous-acetic acid or aqueous-alcoholic solution and condensing the p-nitroso compound so obtained with β-naphthol, the improvement which comprises condensing the suspension of the p-nitroso compound obtained as described above with the β-naphthol without being intermediately isolated.

---

The present invention relates to a process for the manufacture of basic oxazine dyestuffs.

In the preparation of basic oxazine dyestuffs it is known that p-nitroso compounds of aromatic amines, such as nitroso-dimethylaniline or nitroso-diethyl-m-phenetidine, are condensed with m-amidophenols (cf. German Pats. Nos. 62,367 and 3,00,258). When, instead of amidophenols, β-naphthol or derivatives thereof are used, dyestuffs of the type "Meldola's blue" are obtained. These known processes that are used still today on an industrial scale have the disadvantage that they are carried out in separate reaction steps:

(1) Preparation of the nitroso compound from aromatic amines in an aqueous solution of mineral acids.
(2) Isolation of the mineral-acidic nitroso compound by suction-filtration and drying, and
(3) Condensation of this compound with a m-amidophenol in an alcoholic solution, whereupon the nitroso compound must be added to the boiling m-amidophenol solution.

The poisonous nitroso compound can only be handled with care and precaution since it may cause considerable damage of the human skin. Therefore, the manufacture of the dyestuffs requires considerable expense of apparatus owing to the separate reaction steps and to the difficult handling of the poisonous chemical substances.

It has now been found that basic oxazine dyestuffs of the general Formula 1

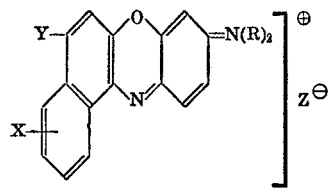

wherein R represents an alkyl group of from 1 to 4 carbon atoms, X represents a hydrogen atom, a hydroxy or alkoxy group of from 1 to 4 carbon atoms, Y represents a hydrogen atom, an amino, monoalkylamino or dialkylamino group, the alkyl group containing from 1 to 4 carbon atoms, and $Z^\ominus$ represents an anion, preferably a chlorine ion or a $ZnCl_3^-$-ion, can be prepared, without the cited difficulties, by treating an amine of the general Formula 2

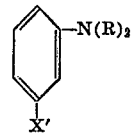

wherein R represents an alkyl group of from 1 to 4 carbon atoms and X' represents a hydrogen atom or an alkoxy group of from 1 to 4 carbon atoms, with nitrous acid in an aqueous-acetic acid or aqueous-alcoholic solution and condensing the suspension of the p-nitroso compound so obtained, without an intermediate isolation, with a naphthol compound of the general Formula 3

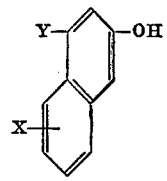

wherein Y and X have the meanings given above, preferably in the presence of surface-active agents. In case X' represents an alkoxy group (—O—alkyl) in the general Formula 2 cited, this group is split off during the reaction in the form of the corresponding alcohol (HO—alkyl).

When the process is carried out according to the invention, a filtration of the p-nitroso compound is not necessary and, thus, this compound has no injurious effect on health. The safety in handling can be increased by performing the further treatment (condensation) of the p-nitroso compound formed as an intermediate in a closed apparatus.

The condensation of the p-nitroso compound of the amine of Formula 2 with the naphthol compound of Formula 3 proceeds, as it is known from the literature, in glacial acetic acid or in an alcoholic solution (cf. Friedländer 2, 158). When the condensation is effected in water, slightly soluble products are obtained which have a very unsatisfactory tinctorial strength. It is, therefore, surprising that the use of an aqueous sodium nitrite solution and aqueous hydrochloric acid during the treatment with nitrous acid in alcohol or of an aqueous sodium nitrite solution during the treatment with nitrous acid in glacial acetic acid has no troubling effect on the subsequent condensation and that the dyestuffs can be obtained in very good yield and purity.

When the treatment with nitrous acid and the condensation are effected in an aqueous-alcoholic medium, it is suitable, as far as the alcoholic component is concerned, to use a lower alkanol, preferably ethanol or propanol. In addition to alkanol, a lower glycol or a polyglycol may be used.

EXAMPLE 1

155 parts of an aqueous sodium nitrate solution (of 40% strength) were introduced at 0–3° C. into a solution of 100 parts of dimethylaniline in 250 parts of ethanol and 220 parts of a 30%–hydrochloric acid. After stirring had been continued for 1 hour, the pH of the solution was adjusted to 2–3 by means of about 5 parts of anhydrous sodium carbonate. The suspension obtained was added in small portions to a solution heated to 70° C. and consisting of 90 parts of β-naphthol, 77 parts of anhydrous zinc chloride, 6 parts of an oxyethylated nonylphenol and 480 parts of ethanol. The solution was then allowed to cool to 25–30° C., the dyestuff of the formula

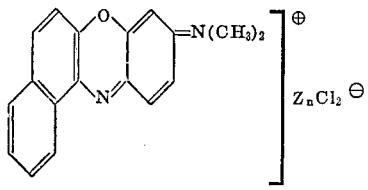

was suction-filtered in the form of the zinc chloride double salt, washed with ethanol that had been acidified by hyhydrochloric acid.

EXAMPLE 2

115 parts of an aqueous sodium nitrite solution (of 40% strength) were introduced at 0–3% C. into a solution of 125 parts of diethyl-m-phenetidine in 240 parts of ethanol and 168 parts of a 30%–hydrochloric acid. After stirring had been continued for 1 hour, the pH of the solution was adjusted to 2–3 by means of about 5 parts of anhydrous sodium carbonate. The suspension obtained was added in small portions to a solution heated to 70° C. and consisting of 62 parts of β-naphthol, 50 parts of anhydrous zinc chloride, 6 parts of oxyethylated nonylphenol and 480 parts of ethanol. The solution was then allowed to cool to 25–30° C., the dyestuff of the formula

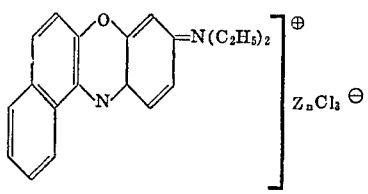

was suction-filtered in the form of the zinc chloride double salt, washed with ethanol that had been acidified by hydrochloric acid and dried.

We claim:
1. In a process for the manufacture of a basic oxazine dyestuff of the formula

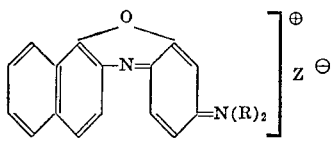

wherein R is an alkyl of 1 to 4 carbon atoms and Z is Cl or ZnCl₃ by heating an amine of the formula

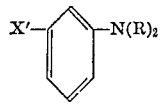

wherein X' is hydrogen or an alkoxy of 1 to 4 carbon atoms with nitrous acid in a aqueous solution of acetic acid or alcohol to form a p-nitroso compound, and condensing the p-nitroso compound with beta-naphthol, the improvement which comprises condensing said p-nitroso compound and said beta-naphthol in said solution without intermediate isolation of said p-nitroso compound.

2. The improvement according to claim 1 wherein said p-nitroso and said beta-naphthol are condensed in the presence of a surface-active agent.

3. The improvement according to calim 1 wherein said alcohol is a lower alkanol.

4. The improvement according to claim 1 wherein said alcohol is ethanol.

5. The improvement according to claim 1 wherein said alcohol is propanol.

6. The improvement according to claim 1 wherein said alcohol is a lower glycol.

7. The improvement according to claim 1 wherein said alcohol is a poly-lower-glycol.

8. The improvement according to claim 1 wherein said R is methyl.

9. The improvement according to claim 1 wherein said R is ethyl.

10. The improvement according to claim 1 wherein said surface-active agent is aluminum stearate or oxethylated nonylphenol.

References Cited

UNITED STATES PATENTS

| | | | |
|---|---|---|---|
| 257,498 | 5/1882 | Koechlin | 260—244 |
| 2,647,895 | 8/1953 | Crossley et al. | 260—244 |
| 2,677,684 | 5/1954 | Crossley et al. | 260—244 |

OTHER REFERENCES

Venkataraman: "Chemistry of Synthetic Dyes," vol. II, (1952) (Academic Press), pp. 762 and 780–791.

HENRY R. JILES, Primary Examiner

R. T. BOND, Assistant Examiner

U.S. Cl. X.R.

260—244